United States Patent
Eldridge et al.

(10) Patent No.: US 6,272,252 B1
(45) Date of Patent: Aug. 7, 2001

(54) SEGMENTING IMAGE DATA INTO BLOCKS AND DELETING SOME PRIOR TO COMPRESSION

(75) Inventors: George L. Eldridge, Long Beach; Farzin Blurfrushan, Redondo Beach; Tom Henning, Hawthorne; San A. Phong, Cerritos; Li-Fung Cheung, Alhambra, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/216,505

(22) Filed: Dec. 18, 1998

(51) Int. Cl.[7] .......................... G06K 9/36
(52) U.S. Cl. ............................. 382/232
(58) Field of Search .................. 382/232, 236, 382/238, 240, 242, 248, 250, 169, 162, 251, 270; 358/426, 432, 433, 442, 443, 455, 458, 461, 462, 464, 465, 466, 467, 468, 520

(56) References Cited

U.S. PATENT DOCUMENTS

| | | | |
|---|---|---|---|
| 4,827,349 | * 5/1989 | Ogata et al. | 358/433 |
| 5,432,620 | * 7/1995 | Watanabe et al. | 358/462 |
| 5,473,444 | * 12/1995 | Sakano et al. | 358/455 |
| 5,629,737 | * 5/1997 | Menez et al. | 382/232 |
| 5,680,477 | * 10/1997 | Asada | 382/169 |
| 5,689,346 | * 11/1997 | Noda et al. | 358/432 |
| 5,745,178 | * 4/1998 | Hartung et al. | 382/251 |
| 5,764,803 | * 6/1998 | Jacquin et al. | 382/236 |
| 5,768,403 | * 6/1998 | Suzuki et al. | 382/162 |
| 5,768,441 | * 6/1998 | Yoshizawa et al. | 382/270 |
| 5,875,262 | * 2/1999 | Asada | 382/169 |

* cited by examiner

Primary Examiner—Jose L. Couso

(57) ABSTRACT

A method of improving the compression ratio of image data in the form of foreground data printed over background data by arranging both kinds of data pixels into 8 by 8 pixel blocks. All blocks that do not contain at least one pixel to be printed are deleted before compression. The deleted blocks will be entirely background pixels that will be overlaid by foreground pixels, or entirely foreground pixels that will not be printed because they are located outside of foreground masks.

3 Claims, 5 Drawing Sheets

FIG. 7

SEGMENTING IMAGE DATA INTO BLOCKS AND DELETING SOME PRIOR TO COMPRESSION

BACKGROUND OF THE INVENTION

A circuit for compressing and decompressing image data in real time prior to printing, and more specifically, forming the image into 8 by 8 pixel blocks prior to transmission from the image generator to the printer so that the compression ratio can be improved by deleting un-needed blocks prior to transmission.

Image generators can produce pages having a variety of image material such as text, computer generated graphics and pictorial data in the form of multi-bit pixels. If this material is to be stored or transmitted, it should be compressed first to reduce system requirements. Normally, the material is separated into its component parts, so that each type of data is compressed by an algorithm that is most efficient for it.

Possible compression algorithms are of two varieties, lossless and lossy. Image data such as computer generated graphics and text are easily compressed using some kind of run length encoding, and can be efficiently compressed without the loss of data. On the other hand, pictorial data does not compress well and it is therefore difficult to know beforehand exactly what the compression ratio will be.

However, to support a high speed printer, a minimum compression ratio must be guaranteed. That is, the transmission rate, the page per minute rate of the printer, and the compression ratio of the data are related. For example, at a known print rate and data transmission rate, a minimum rate of compression will be required so that the printer will never exceed the rate at which data is delivered to it. Thus, a minimum guaranteed compression is required. As stated, pictorial data is the problem, and to increase the compressability of this data, greater rates of compression have been achieved by using an algorithm that allows some loss of data. One common lossy compression algorithm is the industry standard JPEG compression algorithm. This algorithm takes advantage of both vertical and horizontal patterns of data in 8 by 8 pixel blocks to produce its compression.

Normally, data is sent between systems on a scan line basis, while this algorithm compresses data by blocks. To reconcile these two requirements, data is normally sent to the compresser one scan line at a time, the compresser waits until it has received a band of 8 scan lines, divides the band into blocks, compresses the blocks one at a time, reassembles the compressed data block into scan lines, and transmits the compressed data one scan line at a time.

Similarly, the receiver accumulates scan lines until it has a band of blocks, decompresses them one at a time, and assembles 8 decompressed scan lines, which can be sent to a final destination such as a printer.

Frequently, text or graphics are printed over JPEG compressed pictures. These are compressed and decompressed one scan line at a time and can be assembled with the associated decompressed picture scan lines. The resultant overall compression ratio is satisfactory for many purposes, but a further improvement would be desirable.

SUMMARY OF THE INVENTION

In the system described above, some of the compressed data is eventually not used to create a printed page output. For example, between lines and in the spaces between letters of text that is being printed over a background picture, the text data will not be used. Similarly, picture data that lies entirely within a character mask will not be used. Thus the compression could be further increased if this data was not compressed and transmitted.

This is accomplished by separating the text as well as the picture data into 8 by 8 pixel blocks prior to compression. Then, each block is inspected to determine if a boundary between text and picture data occurs within the current block. If there is a boundary, then both types of data are needed, and both are compressed. However, if there is no boundary, then only one type of data is required, and the other type need not be compressed and transmitted. In this way, the compression can be improved.

BRIEF DESCRIPTION OF THE DRAWINGS

FIG. 7 is an example of a bit map.

DETAILED DESCRIPTION OF THE INVENTION

Figure 1:
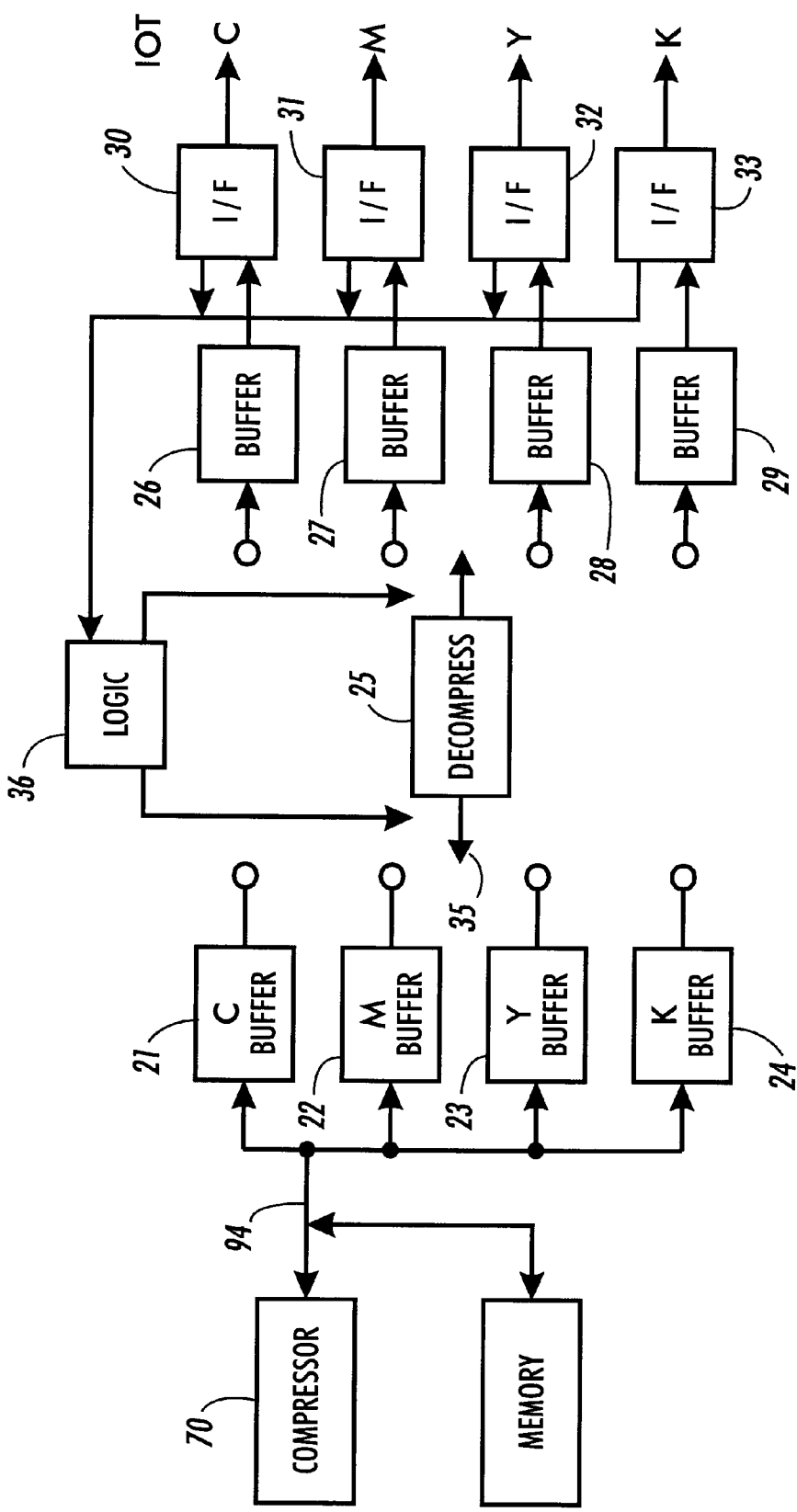
FIG. 1 is an overall black diagram of the system.

As shown in FIG. 1, a compressor receives image data in the form of four color separations, divides each image into 8-line strips, individually compresses each strip and stores the result in four buffers, 21–24, which could be four parts of the same main memory, each part corresponding to a color separation, cyan, magenta, yellow and black. The decompresser 25 can access any one of the four images through a data bus 34, by using direct memory access (DMA) as shown by switch 35. The decompresser 25 computes the location of the compressed data strip, accesses it, decompresses it and sends it to the associated buffer 26–29, where it waits until the interface unit 30–33 requests it. At that point it is sent to the corresponding print head of the image output terminal (IOT).

Figure 2:
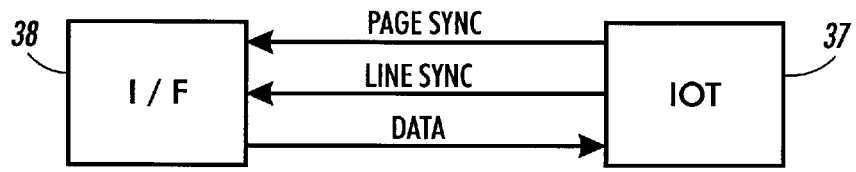
FIG. 2 shows the signals between the printer and its interface.

For timing purposes, each printing head of the IOT generates page and line sync signals as shown in FIG. 2. As the page enters each print head, a page sync signal is generated, and as each scan line is started, a line sync signal is generated. As each line of data is needed, it is supplied by the corresponding interface unit (I/F) 38 to the IOT 37.

The logic 36 of FIG. 1 receives the page and line sync information from the I/F units and makes sure that the data is contained in the buffers 26–29 before it is needed by the IOT. As part of this task, the logic connects the correct part of main memory, shown as buffers 21–24, to the decompresser input, and the decompresser output to the correct buffer 26–29.

Figure 3:
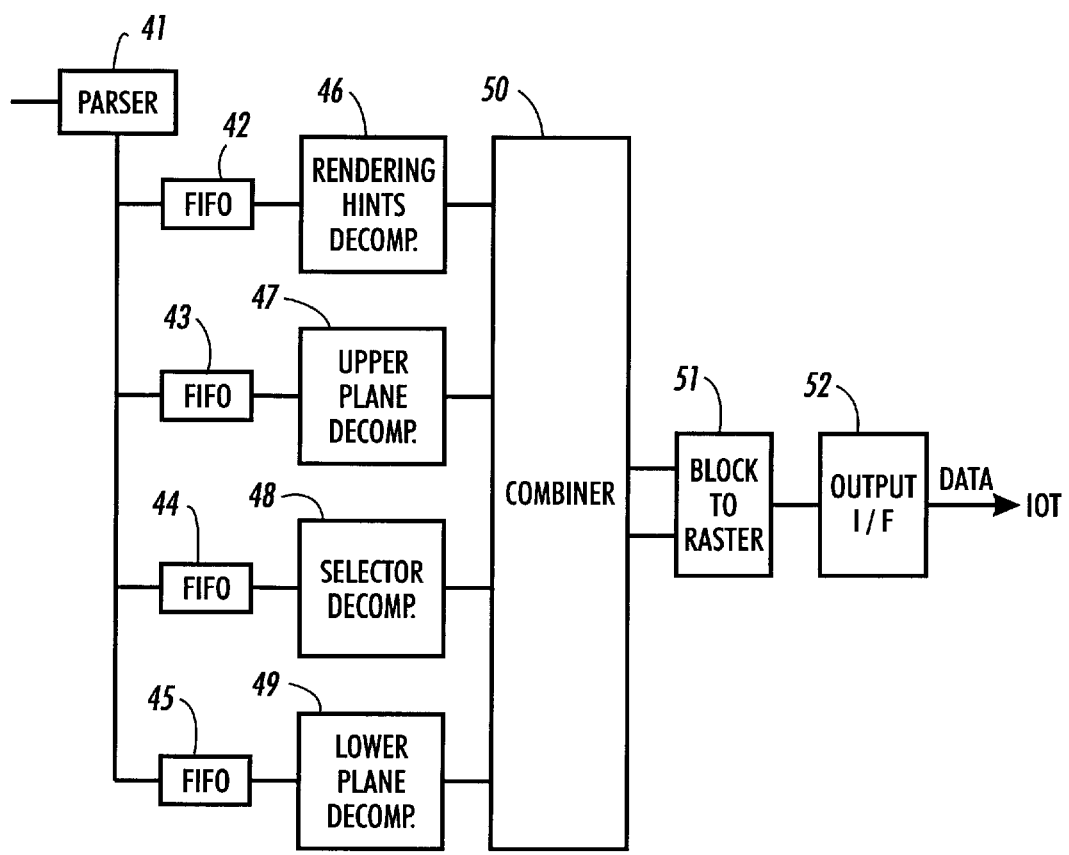
FIG. 3 is a more detailed block diagram of the decompresser.

FIG. 3 is a more detailed diagram of the decompressser. In this system data is transferred from one block to another in bands of eight scan lines each. A compressed band of data is read from memory on the PC bus into the front end interface unit 40. Printing hints are supplied along with the data, and can specify rendering hints such as halftone screens, and whether the desired image is background or overlay.

The parser 41 separates the data into types and supplies the compressed data to the correct channel comprising a FIFO 42–45 and a decompresser 46–49. Each type of data has a decompresser optimized for that type of data. Therefore, a separate decompresser is supplied for rendering hints, upper plane or overlay 46, lower plane or background 49, and selector 48 for selecting between the upper and lower plane. The channels are combined onto one line at the combiner 50 and sent out on a single line as shown in FIG. 1.

Figure 4:
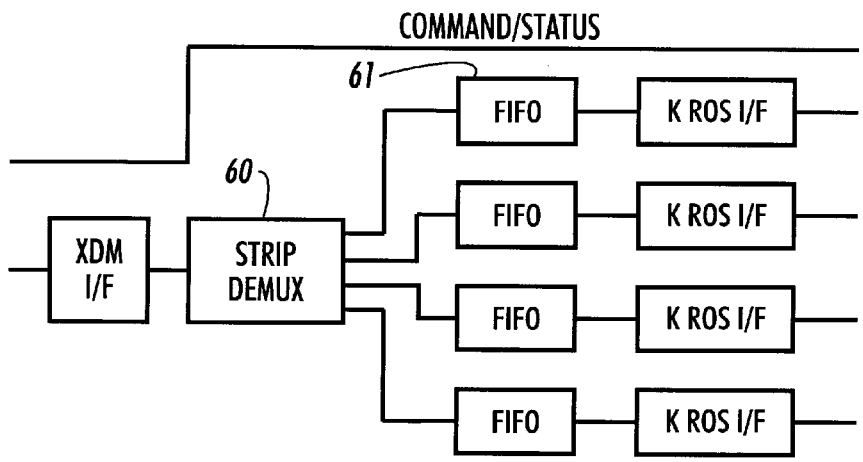
FIG. 4 is a block diagram of the demultiplexing elements.

The data on the single line of the decompresser output is separated into four separations using the demultiplexer circuit of FIG. 4. Normally, it is to be expected that compressed image data from a memory would be in raster order, but in this case, because the data is JPEG decoded, the data is received from memory in 8 by 8 pixel blocks. However, the data still must be sent to the IOT as image separations in raster order. This reordering is done in the strip demultiplexer 60, which sends eight consecutive lines to the first FIFO 61, then eight to the second FIFO, etc. Then repeats starting with the first FIFO again. There is one FIFO for each ROS (i.e., each color separation). The FIFO's are of sufficient depth to hold a minimum of 16 scanlines of video data and rendering hints. The FIFO's are loaded 8 lines at a time at a rate of 55 MP/s. The FIFO's are emptied continuously by the ROS interface at a rate of 13.7 MP/s. The FIFO's serve two purposes. The first purpose is to provide the buffering necessary to smooth the 8-line burst transfers. The second function is to cover the slight variation of timing between the individual ROS modules. Only valid video data and rendering hints are loaded into the FIFO). Data coming during the interpage gap of the associated ROS is not loaded into the FIFO.

The ROS interface controls the transfer of video data and rendering hints to the printer ROS module. There is a ROS interface for each color separation. A state-machine in each ROS interface controls the transfer of video data and rendering hints based on the Page sync and line sync signals from the printer. The ROS interface generates a return line sync and video clock along with the data. Each of the ROS interfaces is independent.

The timing of the high-speed byte-wide interface between the decompresser and the four separation buffers is controlled by an input state machine. The function of the state machine is to transfer scanlines from the decompresser to the FIFO's of the printer. The input state machine is responsible for demultiplexing the video data and rendering hints by routing each input data scanline to the proper FIFO.

The interface operates using page request and line request signals driven to the decompresser. The FIFO board receives video data, rendering hints, data valid signals and video clock signals from the decompresser.

The interface performs a burst transfer of a full scanline of video data and rendering hints for each line request. The input state machine must insure that there is sufficient room in the target FIFO to allow the transfer of a full scanline of data (8 KB).

Operation of the FIFO board begins with the initialization of the FIFO's to empty and the reset of the input state machine. The input state machine then waits for receipt of a page sync from the K separation of the printer.

Upon receiving a page sync from the printer K separation, the input state machine activates the page request on the interface I/F. The state machine points to the K FIFO and activates line request to request the transfer of the first scanline of video data and rendering hints. When data valid goes active the scanline of data is captured by the K FIFO. There is room in the FIFO so the process repeats for the next seven lines.

After eight scanlines of data have been transferred to the K FIFO the input state machine selects the C FIFO as the designation. The C FIFO is empty so a line request is issued to transfer a line. The C separation is not yet carrying valid video data and rendering hints, but 8 scanlines of data are still transferred. One bit of the rendering hints is decoded to indicate that the data is not valid. The data is transferred from the interface I/F but is not actually loaded into the C FIFO. The process repeats for the M and Y FIFO's.

The input state machine then selects the K FIFO. Scanlines are transferred into the K FIFO until another eight scanlines are transferred or there is no room in the FIFO. If there is no room in the FIFO, the input state machine must hold off on sending the line request until there is sufficient room in the FIFO. The check for sufficient room must be made on all transfers.

The FIFO's act as averaging buffers for the demultiplexer as well as buffers to cover the slight variations in timing between the ROS modules. The FIFO's must be a minimum of 16 scanlines of video data and rendering hints. Each line is about 5 K pixels. The printer uses 8 bits of video data per pixel and one bit of rendering hint per pixel. Therefore the size of the FIFO for each separation must be 80 K×9. The FIFO must have an almost full and an almost empty indicator. The almost full indicator must indicate when there is no longer room for one scanline. The almost empty indicator must indicate when there is just one scanline in the FIFO.

The FIFO's are filled at a rate of 55 MP/s and dumped at a rate of 13.7 MP/s. At any given time only one FIFO is being filled but all the FIFO's can be dumping simultaneously.

The interface to the printer is controlled by an output state machine on the printer board. Actually, there are four output state machines; one for each color separation. Four state machines are required since the four ROS modules operate independently.

The function of each output state machine is to transfer scanlines from the printer board to the associated ROS module.

Each printer interface operates using page sync and line sync signals driven to the printer ROS module. The printer board transmits video data and rendering hints, line sync and video clock signals.

Operation of the printer board begins with the initialization of the FIFO's to empty and the reset of the output state machines. The command and status signals from the decompresser are passed directly through the printer board to the printer.

Figure 5:
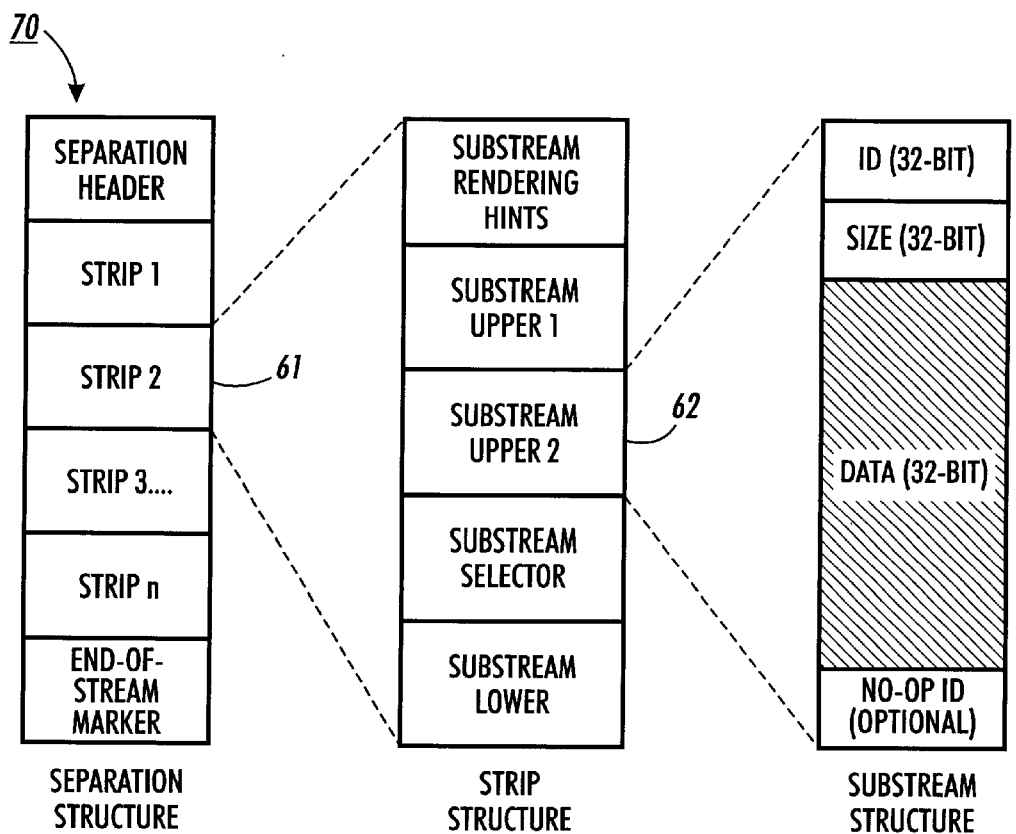
FIG. 5 shown how the data stream is formatted.

A color page is typically composed of 4 or 5 color separations. Each separation is divided into strips of 8 scan lines, and is compressed independently. FIG. 5 depicts the separation, strip and substream structures, and shows the types of decompression algorithms that would be used for a color image.

The separation structure 70 contains a separation header, a number of strips, and an end-of-stream marker. The separation header contains page related information such as image size, margin information, Q table, and Huffman table which are not considered as part of the data stream. The host communicates this information to the printer as information on how to decompress the data.

A strip 61 contains multiple substreams and there are as many as five (rendering hints, two upper planes of data, selector instructions, and a lower plane of data). The minimum number is two (selector and upper or selector and lower) for a strip that contains JPEG or LZ data only.

Each substream 62 consists of an ID and a byte count. The ID information is used to tag the incoming data to indicate the data as being one of the 5 substream types, and the byte count provides the length of the substream data. At the end of each substream, if the byte count is not 32-bit word aligned, padding is inserted to pad it to be word aligned so that the next ID can start on a word boundary.

Finally, the substream win be divided into 8 by 8 pixel blocks for compression.

Figure 6:
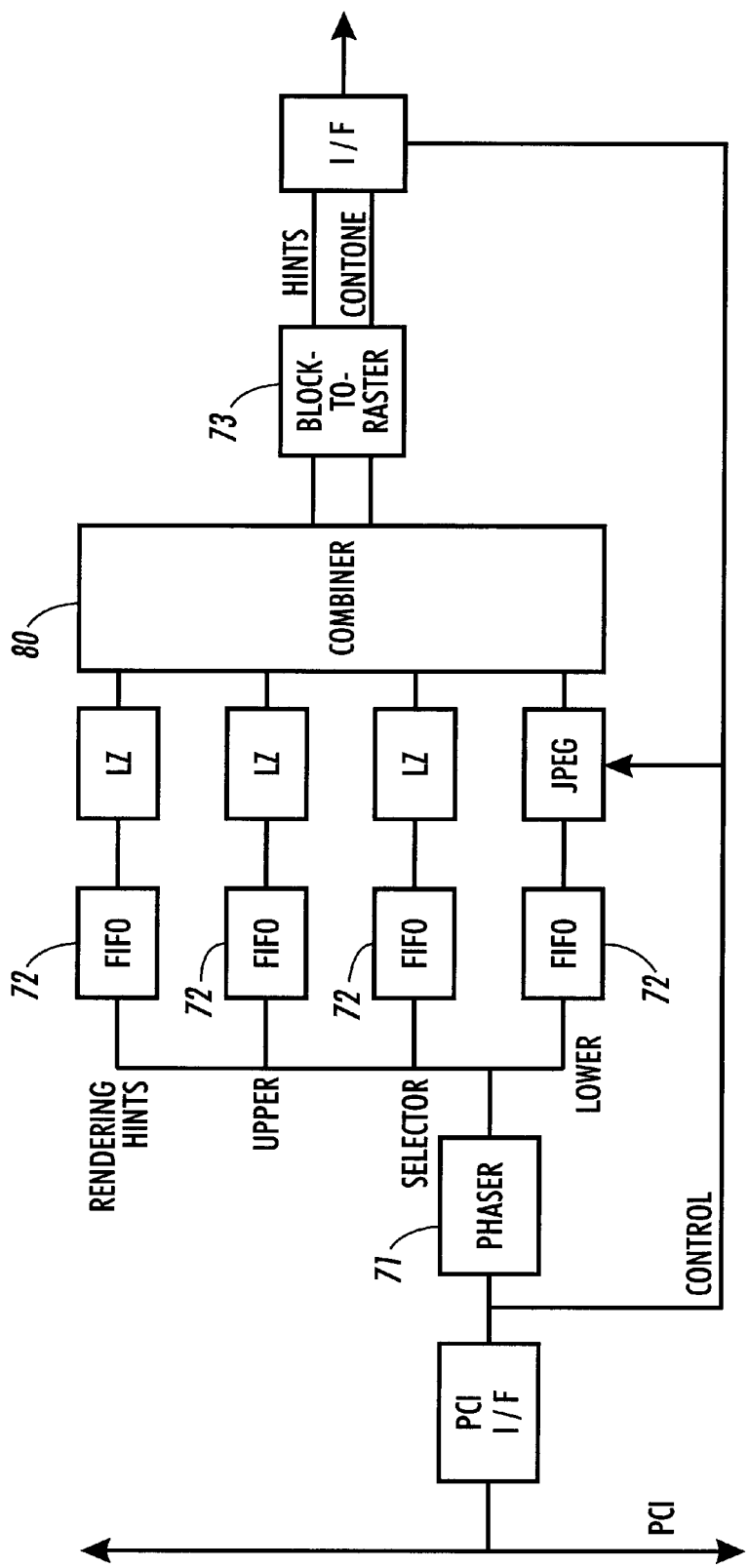
FIG. 6 is a block diagram of another embodiment of the invention.

FIG. 6 is an overall block diagram of one embodiment invention. The input page information arrives on one line at the input. First the instructions are separated and used as instructions for the combiner 80. Then the remainder is separated out into its contone, text and graphics components at the parser 71 and sent to its associated channel. In all cases it is temporarily stored in a 16 line FIFO buffer 72 before being compressed. The combiner 80 must be capable of waiting when any decompresser is not ready. The combiner must also wait when the raster to block converter 73 is not ready. The combiner continues to process data as long as it can, prior to waiting.

In this figure, the text or computer graphics image data is decompressed with a lossless algorithm, such as the Lempel Ziv (LZ) variant, and is referred to as the upper (plane). This algorithm compresses data by building up a history of recent data patterns, and trying to find the current data pattern in the history. If there is a match, the pointer to the most recent occurrence is output rather than the data itself. The amount of compression is dependent on the data, and the amount of compression is not adjustable. If the compression is not sufficient, a lossy compression must be used for some parts of the image. The contone image is decompressed with a lossy algorithm and is called the lower plane. Within each 8 by 8 pixel block, the combiner 70 receives instruction data on the control line, and picks one pixel at a time for the output. As described above, each 8 by 8 pixel block is completely assembled in a block buffer 73. When an entire block is assembled, it is transmitted to a band buffer, and when the band buffer contains an entire scan line of blocks, the entire band is sent to the printer.

There are two additional planes of information in the format. The rendering hints are simply instructions for later hardware blocks on how to print the final image. One simple case would be where the contone should be printed as halftone. Another would be to treat the color as a sweep rather than as a series of lines of gradually differing color. These rendering hints are losslessly compressed and decompressed and simply handed along from one hardware element to the next until they arrive at the point in the system where their function is called for.

Figure 7:
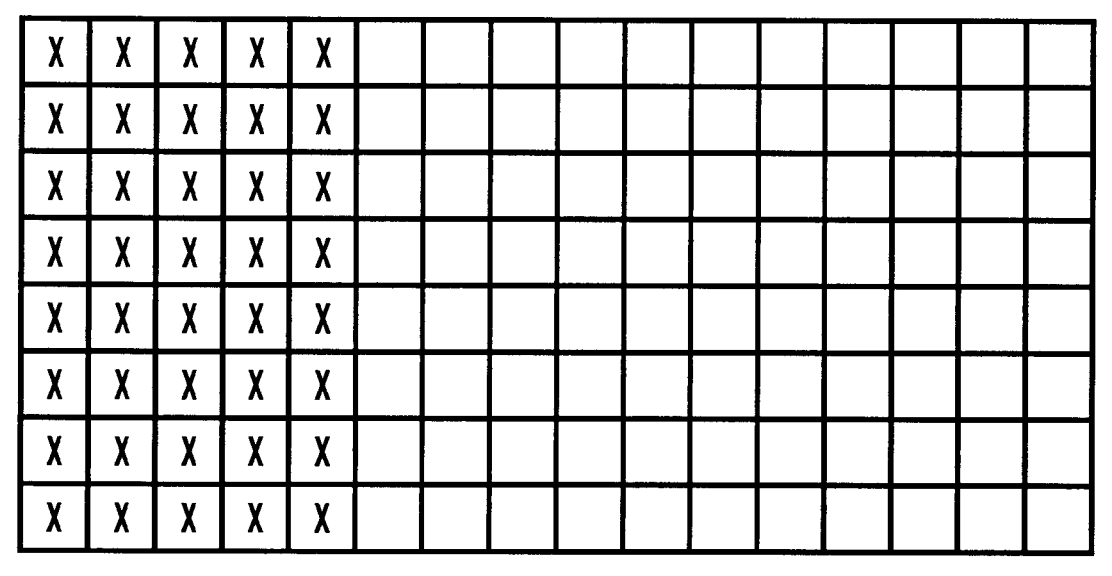

The actual choice that must be made at the combiner 80 is usually between the upper and lower plane, and this is most easily conceptualized by a bit map. FIG. 7 shows an example of two 8 by 8 pixel blocks, the left one of which contains a boundary between a background picture shown as blank pixels and foreground text pixels shown as X's. The bit map for this would be a "1" for any pixel and must be printed in black and a "0" for any pixel printed in color. This one-bit map would be sent to the combiner and used to select between the upper and lower planes. This bit map would have been losslessly compressed and decompressed in the Selector channel.

When there is a boundary within a block, as in the left block of FIG. 7, between two different kinds of data, blocks of both types must be available to the combiner 10. On the other hand, if all pixels in a block are from the same channel, then only one block need be made available to the combiner, the other need not be processed, and the compression ratio is improved.

The Selector plane is normally losslessly compressed. However, in case of insufficient compression, this channel cannot use a lossy compressor since no bits of data can be lost. The best that can be done here is to recompress the data again if the original compression does not meet the compression guarantees.

JPEG compression uses the Discrete Cosine Transform, quantizes the frequency coefficients, reorders them, and then uses Huffman encoding. The DC term is coded as the difference from the previously compressed block. The amount of compression achieved with JPEG is dependent on the imager and the Q (quantization) tables. In this embodiment, four tables are used. One selection switches between Q tables optimized for line-art or for pictorials. The other selection switches between nominal compression and aggressive compression.

Two kinds of compression are guaranteed in this system, full page and 8-line strip. The full page compression is guaranteed at a ratio of 10:1. This is based on the four planes of data, and is used to reduce the system capacity requirements of disk storage and disk transfer bandwidth. The 8-line strip requirement is 3.2 to 1 and is based on rates of 8:1 for rendering hints (4-bits per pixel), 12:1 for upper plane (8 bits per pixel), 6:1 for the selector plane (1-bit per pixel), and 7:1 for the lower plane (8-bits per pixel).

The compression guarantees are enforced at the time the format is generated. If the data in the upper plane does not compress well enough, the data is compressed in the lower plane. If the selector or rendering hint plane does not meet the guarantee, it is simplified and recompressed.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of compressing a stream of image data comprising:

dividing the image data into m by n pixel blocks, wherein each block comprises a foreground layer and a background layer;

for each block:
if the block includes a boundary between pixels in the foreground layer and pixels in the background layer, then compressing both the foreground layer and the background layer;
if all of the pixels in the background layer are overlaid by all of the pixels in the foreground layer, then deleting the entire background layer and compressing the foreground layer;
if none of the pixels in the foreground layer are to be used to print the foreground, then deleting the entire foreground layer and compressing the background layer; and reassembling the compressed blocks into compressed image data.

2. The method of claim 1, wherein the compressing steps comprise compressing using a lossy compression algorithm.

3. The method of claim 2, wherein the lossy compression algorithm comprises a JPEG algorithm.

* * * * *